United States Patent
Suzu

(10) Patent No.: US 7,430,399 B2
(45) Date of Patent: Sep. 30, 2008

(54) BROADCAST RECEIVER RECEIVING BROADCASTS UTILIZING VARIABLE DIRECTIONAL ANTENNA

(75) Inventor: Hirokazu Suzu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 496 days.

(21) Appl. No.: 11/291,676

(22) Filed: Nov. 30, 2005

(65) Prior Publication Data

US 2006/0114361 A1 Jun. 1, 2006

(30) Foreign Application Priority Data

Nov. 30, 2004 (JP) ............... 2004-346626

(51) Int. Cl.
 *H04B 1/00* (2006.01)
(52) U.S. Cl. .................. 455/63.4; 455/25; 455/575.7; 455/135; 725/72
(58) Field of Classification Search ............... 455/63.4, 455/25, 575.7, 135; 725/72
 See application file for complete search history.

(56) References Cited

U.S. PATENT DOCUMENTS 7,242,424 B2 * 7/2007 Lee ............... 348/180

2004/0248517 A1 * 12/2004 Reichgott et al. .......... 455/63.4
2007/0044125 A1 * 2/2007 Lee ............................. 725/72

FOREIGN PATENT DOCUMENTS

| JP | 2003-163853 | 6/2003 |
| JP | 2003-163854 | 6/2003 |

OTHER PUBLICATIONS

Patent Abstracts of Japan, Publication No. 2003-163853, dated Jun. 6, 2003 (1 page).
Patent Abstracts of Japan, Publication No. 2003-163854, dated Jun. 6, 2003 (1 page).

* cited by examiner

*Primary Examiner*—Sanh D Phu
(74) *Attorney, Agent, or Firm*—Osha Liang LLP

(57) ABSTRACT

A broadcast receiver is connected to a variable directional antenna qualified as an antenna capable of modifying a reception direction of a broadcast wave. When arriving at a pre-stored timing, the broadcast receiver executes channel search utilizing the variable directional antenna on the condition that the tuner is not currently in operation. In the channel search, determination is made whether a broadcast wave is valid for reception for all reception directions by the variable directional antenna with respect to each of all prestored frequencies.

4 Claims, 6 Drawing Sheets

| CH | RECEPTION VALID/INVALID | ANTENNA DIRECTION | FLAG |
|---|---|---|---|
| 2 | ○ | 3, 4, 5, 12 | — |
| 3 | × | — | — |
| 4 | ○ | 1 | — |
| 5 | ○ | 8 | ○ |
| ⋮ | ⋮ | ⋮ | ⋮ |
| 68 | × | — | — |
| 69 | ○ | 1, 2, 3 | — |

BROADCAST RECEIVER RECEIVING BROADCASTS UTILIZING VARIABLE DIRECTIONAL ANTENNA

BACKGROUND OF THE INVENTION

1. Field of the Invention

The present invention relates to broadcast receivers, particularly a broadcast receiver that can receive broadcasts utilizing a variable directional antenna.

2. Description of the Related Art

Television broadcasting has the frequency band of VHF (Very High Frequency) and UHF (Ultra High Frequency) allotted. In general, the Yagi antenna is employed for receiving television broadcast signals. The Yagi antenna is constituted of a reflector, a radiator, and a director, and has high directivity towards the director side by the function of the reflector. The merit of large gain is also recognized in the Yagi antenna.

The Yagi antenna is set to have its directivity match the direction of the broadcast station in order to obtain favorable reception. A receiver employing such an antenna carries out the process of searching for a channel valid for reception by that receiver. This process is called "channel search".

Japanese Patent Laying-Open No. 2003-163853 discloses a digital broadcast receiver that conducts channel search automatically. In the case where the power is not ON when the date to execute channel search that is specified by the user matches the current date at this digital broadcast receiver, a power ON process is carried out, followed by execution of a search process. In the case where the power is ON, waiting is conducted until the power OFF key is operated, and then a channel search process is conducted.

Japanese Patent Laying-Open No. 2003-163854 discloses a digital broadcast receiver conducting channel search avoiding the time when a program is being viewed. This digital broadcast receiver delays the power OFF process, when the user specifies a power OFF operation at the receiver using a remote control transmitter or the like, to carry out a channel search process.

Since the antenna is generally installed at the roof or the like of a building in a fixed manner, the directivity cannot be readily modified when once installed. In the case where a plurality of broadcast stations are located in a distributed manner, only the broadcast signal of a broadcast station in a specific direction corresponding to the directivity could be received.

In view of the foregoing, there is proposed a variable directional antenna that can have the directivity switched in several directions to allow reception of waves from various broadcast stations that are located in all directions. A smart antenna is known as one of such variable directional antennas. The smart antenna is formed of a plurality of antenna elements. The directivity can be switched by exciting each antenna element at an appropriate amplitude and phase.

The usage of the smart antenna set forth above allows broadcast waves to be received from various broadcast stations even when the stations are located in a distributed manner.

In order to receive waves from the best serving direction by a receiver utilizing such a variable directional antenna, it is considered that channel search must be executed in a manner different from that of the receiver that utilizes a conventional Yagi antenna.

Channel search utilizing a variable directional antenna is generally time consuming. Specifically, the time required for channel search utilizing a variable directional antenna is several times that required for channel search utilizing a unidirectional antenna such as the Yagi antenna. For example, the channel search based on a unidirectional antenna requires approximately two minutes, whereas the channel search executed based on a variable directional antenna switchable in 16 directions for all the channels (for example, when channels 2-69 are set) as well as for all the receiving directions takes approximately thirty minutes. It is therefore considered that some measures must be taken to eliminate inconvenience on the user as to the timing of executing channel search by a receiver that utilizes a variable directional antenna.

However, few measures related to channel search are offered in conventional receivers utilizing variable directional antennas

SUMMARY OF THE INVENTION

In view of the foregoing, an object of the present invention is to allow channel search to be conducted at an appropriate timing in a broadcast receiver utilizing a variable directional antenna.

According to an aspect of the present invention, a broadcast receiver connected to a variable directional antenna qualified as an antenna capable of modifying the reception direction of a broadcast wave includes a tuner selecting a frequency of a broadcast wave received by the variable directional antenna, a control unit controlling the frequency to be selected with respect to the tuner, a determination unit determining whether the broadcast wave at the frequency selected by the tuner is valid for reception or not, and a storage unit storing information related to the timing of channel search utilizing the variable directional antenna and respective frequencies of broadcast waves corresponding to a plurality of channels. When determination is made of arriving at the timing stored in the storage unit, the control unit causes the determination unit to determine whether the broadcast wave is valid for reception for all reception directions by the variable directional antenna with respect to each of all the frequencies stored in the storage unit, on the condition that the tuner is not currently in operation, as the channel search utilizing the variable directional antenna.

In accordance with the present invention, execution of channel search is avoided even when arriving at the time to initiate channel search when the tuner is currently in operation. This prevents the event of the operation of the tuner being interrupted for approximately 30 minutes due to channel search when the user is watching a program with the tuner operating, or when the tuner is operating for a preprogrammed recording operation.

According to another aspect of the present invention, a broadcast receiver connected to a variable directional antenna qualified as an antenna capable of modifying a reception direction of a broadcast wave includes a tuner selecting a frequency of a broadcast wave received by the variable directional antenna, a control unit controlling the frequency to be selected with respect to the tuner, a determination unit determining whether a broadcast wave at the frequency selected by the tuner is valid for reception, and a storage unit storing information related to the timing of channel search utilizing the variable directional antenna and respective frequencies of broadcast waves corresponding to a plurality of channels. When determination is made of arriving at the timing stored in the storage unit, the control unit causes the determination unit to determine whether a broadcast wave is valid for reception for all reception directions by the variable directional antenna with respect to each of all the frequencies stored in the storage unit, on the condition that the tuner is not currently in operation, as the channel search utilizing the variable directional antenna. When determination is made of arriving at the timing stored in the storage unit and of current operation of the tuner, channel search is executed utilizing the variable directional antenna, on the condition that the operation of the tuner has ended. Further, when a request to select a specific frequency of a broadcast wave received by the variable directional antenna is made to the tuner during execution of channel search utilizing the variable directional antenna, channel search utilizing the variable directional antenna is executed on the condition that the operation of the tuner based on the request has ended.

In accordance with the present invention, channel search will be executed on the condition that the operation by the tuner has ended, even in the case where execution of channel search has been suppressed upon arriving at the time to initiate channel search. Accordingly, channel search can be executed reliably without any inconvenience on the user.

When the tuner is to initiate operation for the user to watch a program or for a preprogrammed recording operation during execution of channel search, the channel search is interrupted for the tuner to initiate an appropriate operation. Following completion of the operation by the tuner, the channel search is executed again. Thus, channel search can be executed reliably without inconvenience on the user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
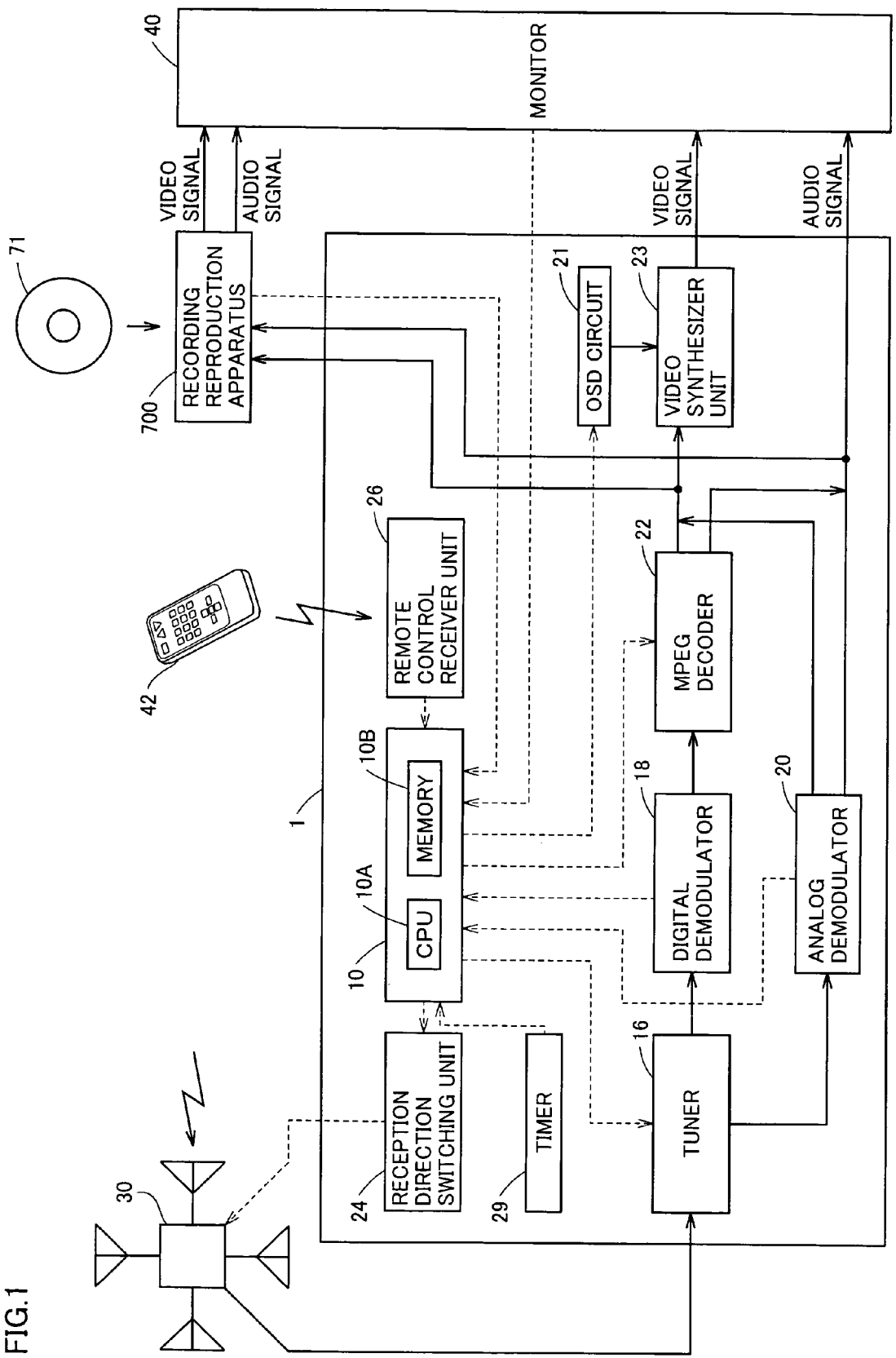
FIG. 1 schematically shows a configuration of a broadcast receiver according to an embodiment of the present invention.

An embodiment of a broadcast receiver of the present invention will be described in detail hereinafter with reference to the drawings. In the drawings, the same or corresponding elements have the same reference character allotted, and description thereof will not be repeated.

Although a smart antenna is employed as the antenna receiving a broadcast signal in the present embodiment, the variable directional antenna of the present invention is not limited thereto. Any antenna capable of switching its directivity can be employed in the present invention.

Referring to FIG. 1, a broadcast receiver 1 is connected to a smart antenna 30 to receive broadcast signals utilizing smart antenna 30, and outputs a reception direction switching signal to smart antenna 30. Broadcast receiver 1 also outputs video signals and audio signals to a monitor 40. Broadcast receiver 1 also receives an instruction signal from a remote controller 42.

Smart antenna 30 is formed of a plurality of antenna elements. Smart antenna 30 receives a reception direction switching signal transmitted from broadcast receiver 1 to alter the excitation for each antenna element to switch the directivity.

The configuration of monitor 40 and remote controller 42 is well-known, and details thereof will not be repeated here.

Broadcast receiver 1 includes a control unit 10, a tuner 16, a digital demodulator 18, an analog demodulator 20, an OSD (On Screen Display) circuit 21, an MPEG (Moving Picture Experts Group) decoder 22, a video synthesizer unit 23, a reception direction switching unit 24, a remote control reception unit 26, and a timer 29.

Control unit 10 includes a CPU 10A executing a program, and a memory 10B storing the program to be executed, data during program execution, and data of the result of program execution.

Tuner 16 extracts a broadcast signal corresponding to the channel selected in response to an instruction from control unit 10 among the received broadcast signals. When the extracted broadcast signal is a digital television broadcast signal, tuner 16 provides the broadcast signal to digital demodulator 18. When the extracted broadcast signal is an analog television broadcast signal, tuner 16 provides the broadcast signal to analog demodulator 20.

Digital demodulator 18 demodulates the broadcast signal received from tuner 16 into an MPEG signal corresponding to video and audio signals. The MPEG signal is output to MPEG decoder 22 where the digital television broadcast signal is decoded using a Reed-Solomon code and a convolution code. Therefore, digital demodulator 18 can apply error correction in the decoding process set forth above. During the error correction process, digital demodulator 18 calculates and provides to control unit 10 the reception data error rate of the received broadcast signal. Since digital demodulator 18 carries out error correction for every predetermined number of data included in the received broadcast signals, the reception data error rate can be calculated within one frame (1/30 seconds) from the start of reception. Control unit 10 can determine the signal level of the broadcast signal by the reception data error rate.

Digital television broadcasting includes the Japanese ISDB-T (Integrated Services Digital Broadcasting for Terrestrial) system as well as the American ATSC (Advanced Television Systems Committee) system and the European DVB-T (Digital Video Broadcasting for Terrestrial) system. All of these systems are capable of error correction since the broadcast signal is decoded and transmitted. The reception data error rate can be calculated during the process thereof. Digital demodulator 18 according to the present embodiment may employ any of the systems set forth above.

Analog demodulator 20 demodulates the broadcast signal received from tuner 16 into video and audio signals. Analog demodulator 20 provides the demodulated audio signal to an external source and a recorder unit 70. Analog demodulator 20 provides the demodulated video signal to video synthesizer unit 23 and recorder unit 70. Analog demodulator 20 provides the information of whether a horizontal synchronizing signal is captured or not to control unit 10.

An analog television broadcast signal includes a horizontal synchronizing signal and a vertical synchronizing signal for the purpose of controlling the horizontal scanning and vertical scanning of the scan lines. Analog demodulator 20 must capture the horizontal and vertical synchronizing signals set forth above in order to demodulate a video signal. The horizontal synchronizing signal has a frequency sufficiently higher than that of the vertical synchronizing signal. Therefore, the horizontal synchronizing signal is readily susceptible to noise and the like, as compared to a vertical synchronizing signal. In other words, the reception state can be determined depending upon whether a horizontal synchronizing signal is captured or not.

Analog demodulator 20 includes an AGC (Auto Gain Control) circuit. The AGC circuit functions to maintain the broadcast signal from tuner 16 at a constant level by feedback control in order to alleviate variation in the contrast of the video caused by the level of magnitude of the broadcast signal of the analog television broadcast.

A horizontal synchronizing signal cannot be captured if the broadcast signal output from the AGC circuit is at a low voltage level. Therefore, the broadcast signal is amplified by the AGC circuit. Control unit 10 can determine the signal level of the broadcast signal based on the amplification factor of the broadcast signal by the AGC circuit when a horizontal synchronizing signal has been captured.

In capturing a horizontal synchronizing signal, analog demodulator 20 applies a noise removal process, a frequency separation process, a synchronizing signal separation process, a shaping amplification process, and the like on the received broadcast signal. Therefore, the process starting from reception up to capturing a horizontal synchronizing signal requires more time than the calculation of the reception data error rate at digital demodulator 18.

Analog television broadcasting corresponds to the NTSC (National System Committee) system employed in Japan and U.S., the PAL (Phase Alternation by Line) system employed in Germany and Great Britain, and the SECAM (Sequential Couleur a Memoiré) system employed in France. Since the broadcast signal includes a horizontal synchronizing signal in all of these systems, the state of reception can be determined based on whether a horizontal synchronizing signal has been captured or not. Television demodulator 20 of the present embodiment is applicable to any of these systems.

OSD circuit 21 responds to an instruction from control unit 10 to generate and provide to video synthesizer unit 23 an OSD signal to display information on a screen of monitor 40. In the present embodiment, OSD circuit 21 is implemented by a hardware circuit. However, the present invention is not limited thereto, and the function of OSD circuit 21 may be implemented by executing software through control unit 10.

MPEG decoder 22 decodes the signal received from digital demodulator 18 into video and audio signals. MPEG decoder 22 provides the decoded audio signal to an external apparatus such as a recording reproduction apparatus 700. MPEG decoder 22 provides the decoded video signal to video synthesizer unit 23 and/or recording reproduction apparatus 700.

The video represented by the video signal received from analog demodulator 20 or MPEG decoder 22 is overlapped with the video represented by the OSD signal from OSD circuit 21 by video synthesizer unit 23. Video synthesizer unit 23 provides the video signal representing the overlapped video to an external apparatus such as monitor 40.

Reception direction switching unit 24 responds to an instruction from control unit 10 to provide a reception direction switching signal to smart antenna 30.

Remote control receiver unit 26 receives an instruction from remote controller 42 and provides the received instruction to control unit 10. The user transmits an instruction through remote controller 42 for a desired operation.

Broadcast receiver 1 is connected to recording reproduction apparatus 700. Recording reproduction apparatus 700 responds to an instruction from control unit 10 to convert the analog signal from analog demodulator 20 or MPEG decoder 22 into MPEG data, which is recorded on a recording medium 71. Recording reproduction apparatus 700 responds to an instruction from control unit 10 to reproduce the signals recorded on recording medium 71 for conversion into video and audio signals. The video and audio signals are output to monitor 40. Simultaneous to the reproduction of the signals recorded at recording medium 71, the video represented by the video signal is overlapped with the video represented by the OSD signal, when received from OSD circuit 21, at monitor 40 for output.

In the present embodiment, recording medium 71 is, for example, a DVD (Digital Versatile Disk). However, the recording medium is not limited thereto, and an optical disk other than a DVD, a magnetic tape such as a video tape, or a magnetic disk such as a hard disk can be used as long as an analog signal or digital signal can be recorded.

In the present embodiment, recording reproduction apparatus 700 converts again the converted analog signal from MPEG decoder 22 into MPEG data. However, the MPEG data may be directly output from digital demodulator 18 to recording reproduction apparatus 700 such that recording reproduction apparatus 700 records that MPEG data.

Timer 29 has time-counting capability. Control unit 10 can refer to the time counted by timer 29.

The present embodiment is described in which smart antenna 30 can modify the reception direction into various directions corresponding to a division of the horizontal plane into 16 by switching, the directivity.

Switching the reception direction of smart antenna 30 in the present embodiment will be described hereinafter with reference to FIG. 2.

Figures 2, 3:
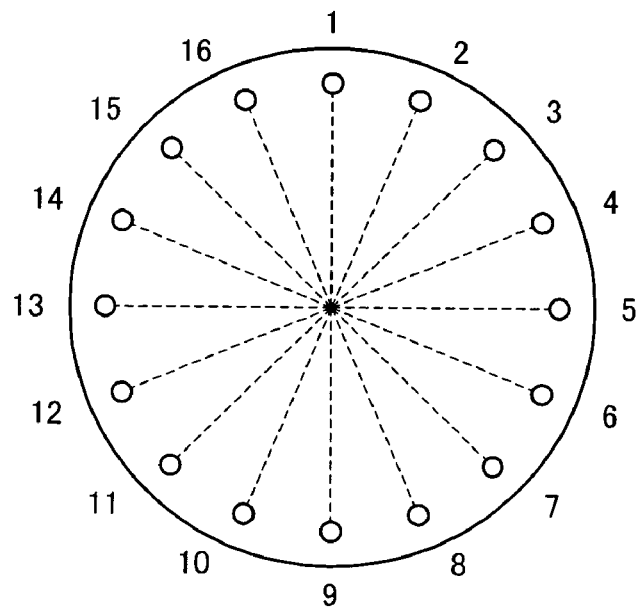
FIG. 2 is a diagram to describe switching of the reception direction of the smart antenna of FIG. 1.
FIG. 3 represents in table form the information stored in the memory of FIG. 1.

In the present invention, the sixteen reception directions of smart antenna 30 is assigned the numbers of 1, 2, . . . , 16 clockwise (positive direction of rotation), as shown in FIG. 2.

In memory 10B of broadcast receiver 1 are stored the information as to whether broadcast receiver 1 is capable of reception for all the channels set as the broadcasting channel (it is assumed that 68 channels, i.e. channels 2-69, for example, are set), the information indicating the reception direction by smart antenna 30 (antenna direction) when valid for reception, and ON/OFF information of the flag indicating whether confirmation has been made of a new channel valid for reception. All the information are stored in, for example, a table form. An ON state of the flag refers to the state where new reception information of the present invention is stored. Storage of the new reception information in the present invention is not limited to the usage of a flag. Another form may be employed as long as the event of a new channel valid for reception is perceivable by CPU 10A in association with respective channels.

Broadcast receiver 1 carries out channel search when arriving at a preset time. As used herein, the "preset time" is the time specified by the user via remote controller 42 and stored in memory 10B. Channel search does not have to be carried out every day. It may be carried out at a certain date and time specified by the user.

Figure 4:
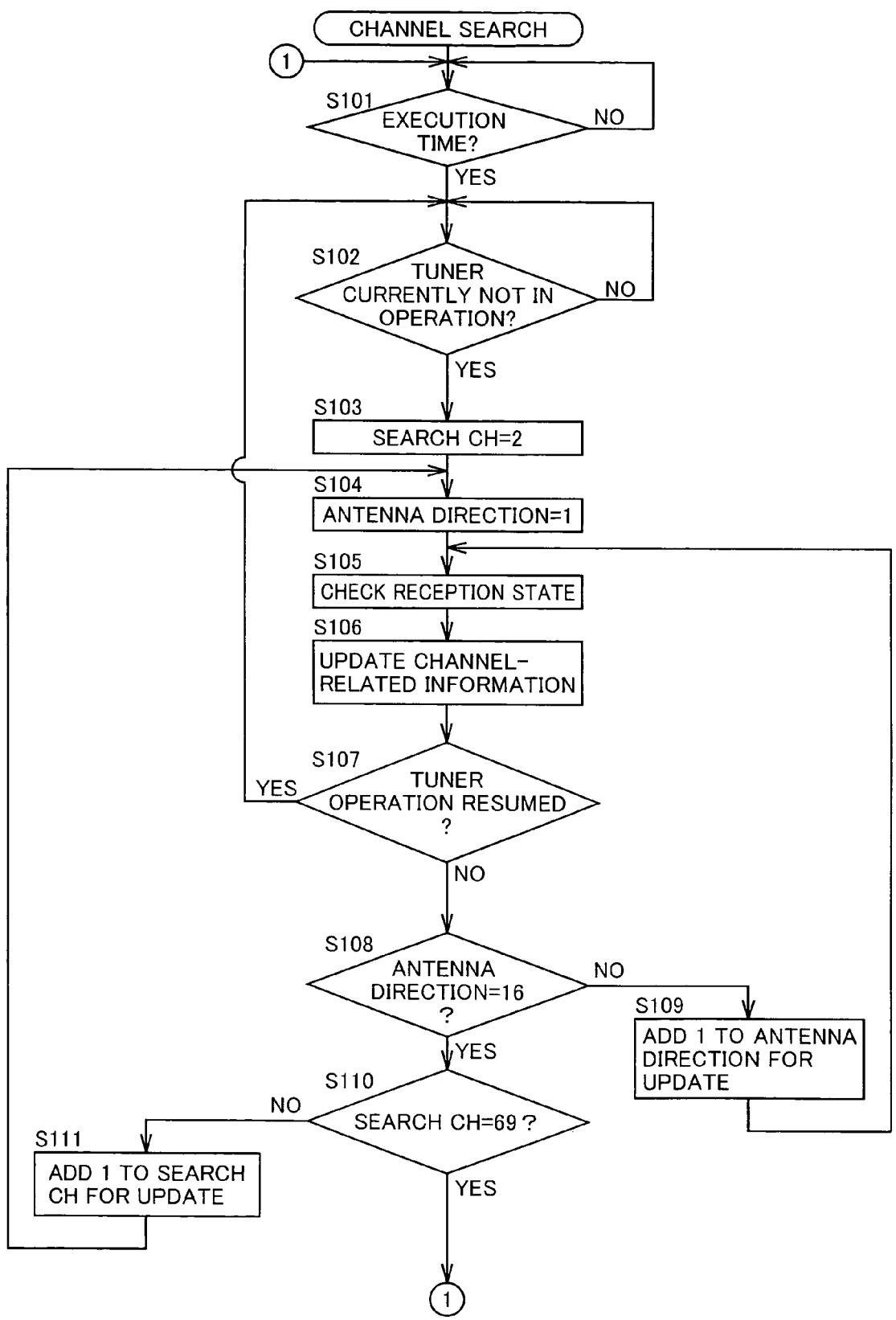
FIG. 4 is a flow chart of a channel search process executed by a CPU (Central Processing Unit) of the broadcast receiver of FIG. 1.

A channel search process executed by CPU 10A of broadcast receiver 1 will be described hereinafter with reference to FIG. 4.

At step S101 (hereinafter, "step" omitted), CPU 10A determines whether the current time counted by timer 29 is equal to the time to initiate channel search. The time to initiate channel search is stored in memory 10B. When CPU 10A determines that the current time does not correspond to the time to initiate channel search, waiting is conducted. When determination is made of arriving at the time to initiate channel search, control proceeds to S102. When channel search is set to OFF, as will be described afterwards, CPU 10A will standby under the process of S101.

At S102, CPU 10A determines whether tuner 16 is currently in operation or not. "Tuner 16 currently in operation" refers to the state in which extraction is conducted of a broadcast signal corresponding to a selected channel in response to an instruction from control unit 10 from the broadcast signals. As used herein, "extraction of a broadcast signal corresponding to a selected channel in response to an instruction from control unit 10" corresponds to "selecting a specified frequency of a broadcast wave received by the variable directional antenna" in the present invention. When CPU 10A determines that tuner 16 is currently in operation, waiting is conducted. When determination is made of not currently in operation, control proceeds to S103.

At S103, CPU 10A sets the channel that is the subject of channel search (the search CH) to "2". In other words, control is effected such that the frequency selected by tuner 16 is the frequency corresponding to channel 2.

At S104, CPU 10A effects control such that the direction of smart antenna 30 corresponds to direction "1" among the definitions of "1" to "16" shown in FIG. 2.

In broadcast receiver 1, the information on the currently set channel with respect to tuner 16 and the information on the direction currently set for smart antenna 30 are stored at predetermined regions in memory 10B. These pieces of information are sequentially updated every time the setting on the channel and antenna direction is modified.

At S105, CPU 10A checks the reception state of the radio wave in the current search CH and antenna direction. Specifically, in the case where the signal of interest is a digital television broadcast signal, determination is made as to whether the signal level of the broadcast signal is at least the predetermined level. In the case where the signal of interest is an analog television broadcast signal, determination is made whether a horizontal synchronizing signal has been captured or not at analog demodulator 20.

At S106, CPU 10A updates the channel-related information (table), as shown in FIG. 3, based on the result of S105. Specifically, when determination is made that the radio wave is valid for reception at the immediately preceding step of S105, i.e. when determination is made that the level of the broadcast signal is at least a predetermined level or that a horizontal synchronizing signal has been captured, information indicating that reception is allowed in the reception valid/invalid column of the corresponding channel (CH "○" in FIG. 3) is stored in the table shown in FIG. 3. Also, the current antenna direction is stored in the antenna direction column in the table. When determination is made that the relevant channel is invalid for reception during the previous execution of a channel search process, the information of turning on the flag ("○" in the flag column in FIG. 3) is stored. In contrast, when determination is made that the radio wave cannot be received in the immediately preceding step of S105, i.e. when determination is made that the level of the broadcast signal is below a predetermined level or that a horizontal synchronizing signal has not been captured, control proceeds to S106 where CPU 10A stores the information indicating that reception is not allowed ("x" in FIG. 3) in the reception valid/invalid column of the corresponding channel (CH) in the table shown in FIG. 3.

Then, CPU 10A determines whether tuner 16 has resumed its operation based on the information input via remote controller 42 and/or preprogrammed recording operation through the timer. When determination is made that the operation of tuner 16 is resumed, control returns to S102, otherwise, control proceeds to S108.

At S108, CPU 10A determines whether the current antenna direction is "16" among the definitions of 1-16. When the current antenna direction is "16", control proceeds to S110, otherwise, control proceeds to S109.

At S109, CPU 10A adds 1 to update the antenna direction, and control returns to S105. Specifically, when the current antenna direction is 1, the antenna direction is modified to 2.

At S110, CPU 10A determines whether the current search CH is 69 or not, i.e. whether the current search channel is the highest channel number. If the current search channel is 69, control returns to S101 to wait for the next channel search process; otherwise, control proceeds to S111 where 1 is added to the current search CH, and control returns to S104.

In the process of the channel search set forth above, CPU 10A determines whether a broadcast wave is valid for reception by smart antenna 30 with respect to all the 16 directions defined for smart antenna 30 for each channel. Accordingly, a broadcast wave transmitted from any direction can be received in a favorable state at broadcast receiver 1.

In accordance with the channel search process set forth above, the channel search utilizing smart antenna 30 is to be initiated basically at the time to start the channel search, stored in memory 10B. However, when tuner 16 is currently in operation, the channel search is deferred until the operation of tuner 16 ends.

Broadcast receiver 1 of the present embodiment may be configured integrally with or separate from monitor 40. In the case where broadcast receiver 1 is formed integrally with monitor 40, determination of whether the power of monitor 40 is ON or not can be made instead of the determination as to whether tuner 16 is currently in operation or not at S102. Monitor 40 with the power turned ON means that the user is watching a program utilizing tuner 16. Therefore, determination is made that the usage of tuner 16 for the channel search is not convenient in such a case. Broadcast receiver 1 may be configured such that channel search is executed subsequent to the power of monitor 40 being turned OFF in such a case (to execute the process subsequent to S103). In the case where monitor 40 and broadcast receiver 1 are configured as different components, a similar configuration can be implemented, provided that broadcast receiver 1 is connected to monitor 40 based on, for example IEEE (the Institute of Electrical and Electronic Engineers) 1394, since CPU 10A can identify whether the power of monitor 40 is ON/OFF.

When the broadcast wave of a channel previously identified as invalid for reception can now be received at broadcast receiver 1 in accordance with the channel search process set forth above, this detection can be recorded by turning ON the flag, for example, as shown in FIG. 3. When the power of broadcast receiver 1 is turned on subsequently, the user is notified of a new channel valid for reception.

Figure 5:
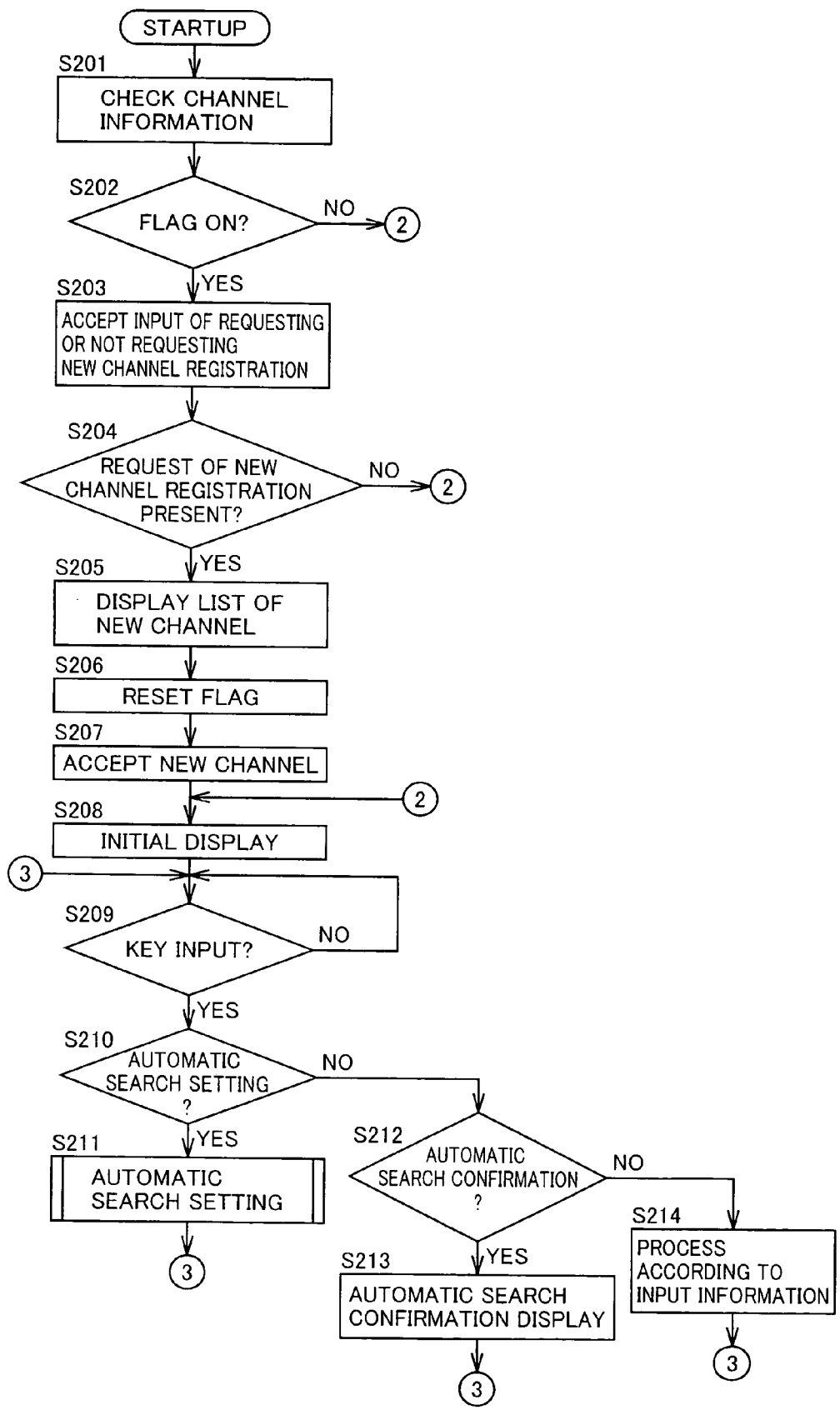
FIG. 5 is a flow chart of a startup process executed by the CPU of the broadcast receiver of FIG. 1.

The startup process executed by CPU 10A when the power of broadcast receiver 1 is turned on, including the aforementioned notification, will be described hereinafter with reference to the flowchart of FIG. 5.

When remote control receiver unit 26 receives from remote controller 42 a signal to turn on the power, CPU 10A checks at S201 for a channel with the flag turned ON in the channel information shown in FIG. 3.

At S202, CPU 10A determines whether there is a channel with an ON flag based on the result of S201. When there is such a channel, control proceeds to S203, otherwise, control proceeds to S208.

Figure 6:
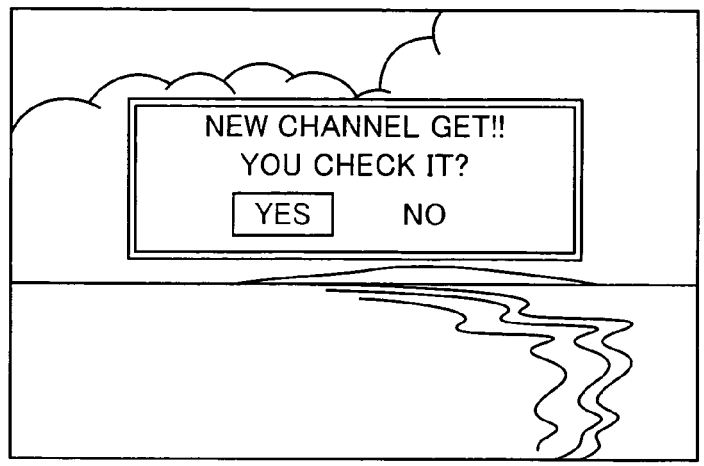
FIGS. 6 and 7 represent examples of a display form on a monitor in the startup process of FIG. 5.

At S203, CPU 10A provides a display on monitor 40 to notify the user of a new channel valid for broadcast reception, as shown in FIG. 6, for example.

The screen shown in FIG. 6 includes the message of "NEW CHANNEL GET !!" that notifies a new channel valid for reception, the message of "YOU CHECK IT?" asking whether registration to view the relevant new channel at broadcast receiver 1 is required or not, the text of "YES" and "NO" to enter the user's intention with respect to the relevant question, and a cursor displayed corresponding to one of the texts. The number of channels that can be tuned in on a station utilizing remote controller 42 or the like for viewing via broadcast receiver 1 is determined in advance. As used herein, "registration" refers to setting in correspondence a broadcast channel as a channel that can be tuned in at broadcast receiver 1. Information for such correspondence is stored in memory 10B.

At this stage, CPU 10A waits for entry of information as to whether registration as a channel to be viewed is requested or not by the user with respect to the new channel valid for broadcast wave reception. The user operates the determination key with the cursor set to either YES or NO with respect to remote controller 42 to input such information.

At S204, CPU 10A determines whether the information input by the user corresponds to a registration request. When the input information corresponds to a registration request, control proceeds to S205, otherwise, control proceeds to S208.

Figure 7:
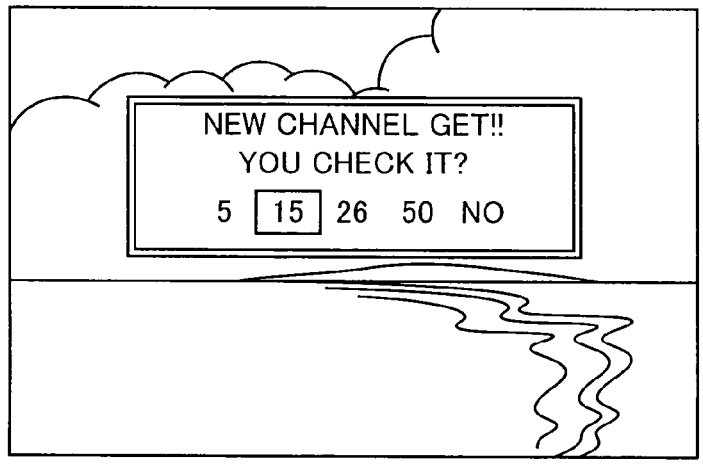

At S205, CPU 10A provides a display of a list of new channels valid for broadcast reception, as shown in FIG. 7, on monitor 40. At this stage, CPU 10A checks the channel information, as shown in FIG. 3, to list up the channels with an ON flag, and displays the numeric value corresponding to all the channels on the list at monitor 40. The display in FIG. 7 indicates that the channels of 5, 15, 26 and 50 are newly valid for reception. The display in FIG. 7 also shows the text of "NO" indicating that registration of the displayed channel is not required.

At S206, CPU 10A resets all the flags in the table shown in FIG. 3.

At S207, CPU 10A accepts input of information as to which channel from the channels on the list of S205 is to be registered by the user. CPU 10A carries out the process of registering the new channel identified as valid for reception based on the information input at S207.

At S208, CPU 10A displays a predetermined initial screen on monitor 40.

At S209, CPU 10A determines whether information corresponding to key operation at remote controller 42 has been input or not at remote control receiver unit 26. When determination is made that such information has been input, control proceeds to S210.

At S210, determination is made whether the input information corresponds to information of conducting automatic search setting. Automatic search setting includes various settings related to channel search described with reference to FIG. 4 and the like. When CPU 10A determines that the information corresponds to automatic search setting, control proceeds to S211, otherwise control proceeds to S212.

At S212, CPU 10A determines whether the input information corresponds to confirmation of automatic search. Automatic search confirmation corresponds to confirmation of the contents of automatic search setting. When determination is made that the input information corresponds to confirming automatic search, control proceeds to S213, otherwise control proceeds to S214.

Figure 8:
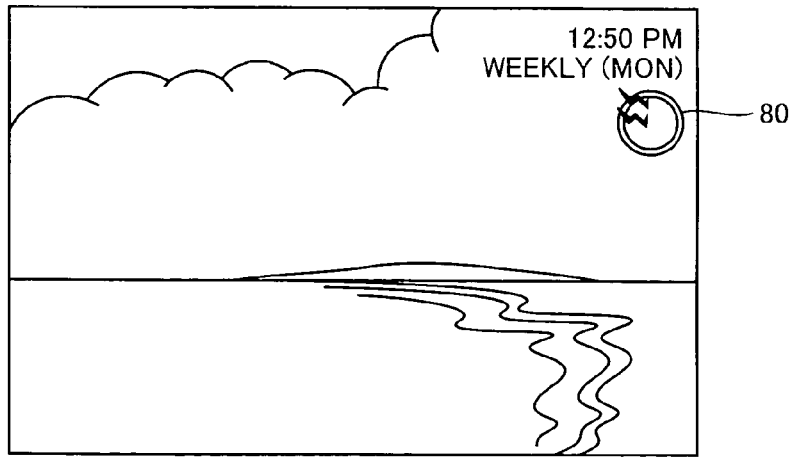
FIG. 8 represents an example of an automatic search confirmation screen displayed on the monitor in the startup process of FIG. 5.

At S213, CPU 10A displays a screen indicating the contents of automatic search setting (automatic search screen) on monitor 40, as shown in FIG. 8. Then, control returns to S209. FIG. 8 provides the display of the character string of "12:50" indicating the time to execute a channel search process, the character string of "WEEKLY (MON)" indicating the date to execute a channel search process, and an image 80 indicating that execution of a channel search process is set. The automatic search screen of FIG. 8 indicates that a channel search process is to be executed once every week on Monday at 12:50.

At S214, CPU 10A identifies the type of information input to remote control receiver unit 26 and executes a process corresponding to the input information. Then, control returns to S209.

Figure 9:
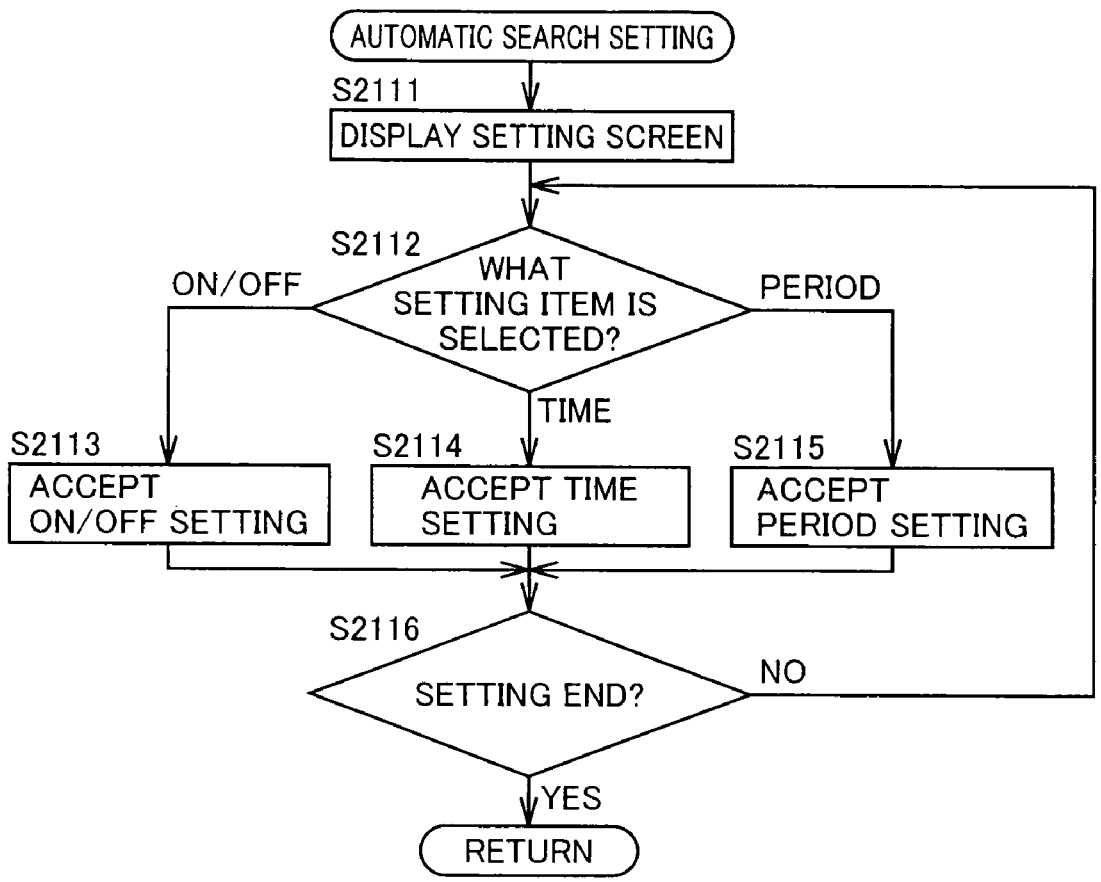
FIG. 9 is a flow chart of a subroutine of the automatic search setting process of FIG. 5.

At S211, CPU 10A executes an automatic search setting process. The contents of the automatic search setting process will be described hereinafter with reference to the flow chart of FIG. 9.

At S2111, CPU 10A displays a screen to conduct automatic search setting (setting screen) on monitor 40. An example of such a setting screen is shown in FIG. 10.

Figure 10:
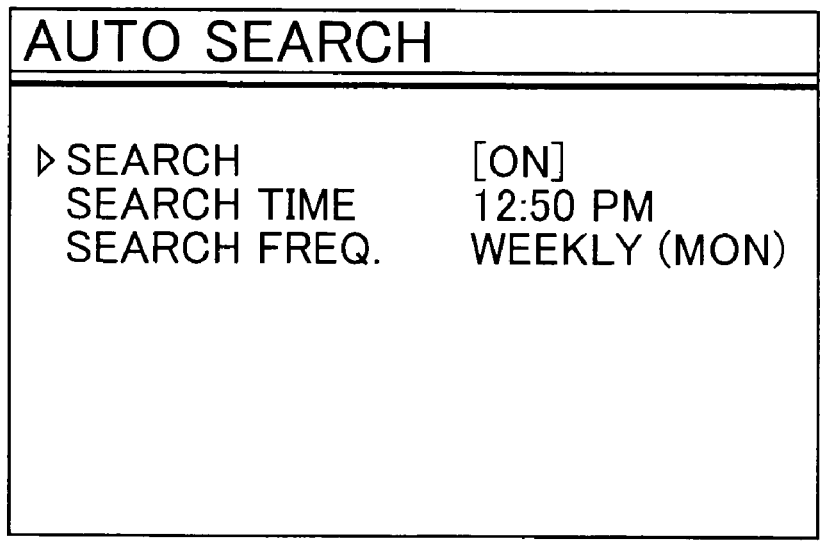
FIG. 10 represents an example of a setting screen displayed in the automatic search setting process of FIG. 9.

The setting screen of FIG. 10 provides the display of the character strings of "SEARCH", "SEARCH TIME", and "SEARCH FREQ." corresponding to the three setting items of "whether a channel search process is to be executed or not (ON/OFF of the channel search process), "the time to execute the channel process", and "the date (period) to execute the channel search process", respectively. Further, the corresponding setting content is displayed at the right side of each character string. Under the displayed state of the setting screen shown in FIG. 10, CPU 10A corresponds to a standby state for input of information selecting a setting item by the user.

When there is information input by the user, CPU 10A determines at S2112 which of the setting items displayed on the setting screen is to be selected in response to the input information. When CPU 10A determines that the information of selecting the ON/OFF of the channel search process has been input, control proceeds to S2113. When determination is made that the information of selecting the time to execute the channel search process has been input, control proceeds to S2114. When determination is made that the information of selecting the date (or period) for execution of the channel search process has been input, control proceeds to S2115.

At S2113, CPU 10A sets the ON/OFF of the channel search process based on the information input by the user. Then, control proceeds to S2116. The setting at this stage corresponds to recording the corresponding information at a predetermined location in memory 10B. When the channel search process is set to OFF here, CPU 10A conducts waiting at S101 in the channel search process described with reference to FIG. 4.

At S2114, CPU 10A sets the time to initiate channel search based on the information input by the user. Then, control proceeds to S2116.

At S2115, CPU 10A sets the day and/or period to conduct channel search based on the information input by the user. Then control proceeds to S2116.

At S101 in the channel search process described with reference to FIG. 4, determination is made whether the current time matches the day, period, and time set at S2114 and S2115.

At S2116, CPU 10A determines whether the user has input information to end the automatic search setting. When determination is made that such information is not input, control returns to S2112, otherwise, the process returns to the main routine.

In accordance with the present embodiment set forth above, channel search is conducted on the day and time specified by the user.

The setting related to channel search can be displayed on monitor 40 for confirmation by appropriate manipulation via remote controller 42, as described with reference to FIG. 8.

CPU 10A may be adapted to carry out a process to modify appropriately the period of the channel search. Specifically, when a new channel valid for reception cannot be identified as a result of consecutive channel search processes, CPU 10A may be configured to modify the period by increasing the interval of executing channel search.

Further specifically, CPU 10A modifies the setting such that the channel search period is doubled when a new channel valid for reception cannot be identified over a predetermined number of times of consecutive channel search processes. For example, when the period of the channel search is set to be conducted every day and a new channel valid for reception could not be identified over a predetermined number of times of channel searches, the period setting is modified such that channel search is conducted on every other day. In the case where the channel search is set to be conducted once a week, the setting is modified such that channel search is conducted on every other week when a new channel valid for reception could not be identified over a predetermined number of times of channel searches. Further, CPU 10A may be configured to modify the setting such that the channel search period is shortened when a new channel valid for reception is newly identified. For example, when the channel search is conducted every other day and a new channel valid for reception is newly identified, CPU 10A may modify the setting such that channel search is conducted every day.

Further, CPU 10A is preferably configured to accumulate information on the time zone when the power of broadcast receiver 1 is ON and analyze the stored information appropriately to predict the time zone corresponding to a power OFF state with respect to a predetermined duration of time such as one week. CPU 10A can then determine whether the time zone during which channel search is to be conducted based on the time set to execute a channel search by the user as set forth above corresponds to the predicted time zone. It is preferable that, when determination is made that the predicted time zone does not match the period of time during which channel search is to be conducted, the time set to execute a channel search is modified such that the period of time of conducting channel search matches the predicted time zone. Accordingly, the time of conducting channel search can be set to avoid the time when the power is ON such as during the time zone when the user is usually watching a program or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast receiver connected to a variable directional antenna qualified as an antenna capable of modifying a reception direction of a broadcast wave, said broadcast receiver comprising:
    a tuner selecting a frequency of a broadcast wave received by said variable directional antenna,
    a control unit controlling the frequency to be selected with respect to said tuner,
    a determination unit determining whether a broadcast wave at the frequency selected by said tuner is valid for reception, and
    a storage unit storing information related to a timing of channel search utilizing said variable directional antenna, and frequencies of broadcast waves corresponding to a plurality of channels,
    wherein said control unit causes, when determination is made of arriving at the timing stored in said storage unit, said determination unit to determine whether a broadcast wave is valid for reception for all reception directions by said variable directional antenna with respect to each of all the frequencies stored in said storage unit, on a condition that said tuner is not currently in operation, as the channel search utilizing said variable directional antenna.

2. The broadcast receiver according to claim 1, wherein said control unit executes, when a request is made of selecting a specific frequency of a broadcast wave received by said variable directional antenna with respect to said tuner during execution of channel search utilizing said variable directional antenna, channel search utilizing said variable directional antenna on a condition that the operation of said tuner based on said request has ended.

3. The broadcast receiver according to claim 1, wherein said control unit executes, when determination is made of arriving at the timing stored in said storage unit and that said tuner is currently in operation, channel search utilizing said variable directional antenna on a condition that the operation of said tuner has ended.

4. The broadcast receiver according to claim 3, wherein said control unit executes, when a request is made of selecting a specific frequency of a broadcast wave received by said variable directional antenna with respect to said tuner during execution of channel search utilizing said variable directional antenna, channel search utilizing said variable directional antenna on a condition that the operation of said tuner based on said request has ended.

* * * * *